Oct. 19, 1926.
G. F. COLBERT ET AL
1,603,936
MIRROR AND COATING FOR THE SAME
Filed April 30, 1926
COATING OF LEAD SULPHIDE
INVENTORS
George F. Colbert
& William H. Colbert
By Archworth Martin
Attorney Patented Oct. 19, 1926.

1,603,936

UNITED STATES PATENT OFFICE.

GEORGE F. COLBERT AND WILLIAM H. COLBERT, OF PITTSBURGH, PENNSYLVANIA.

MIRROR AND COATING FOR THE SAME.

Application filed April 30, 1926. Serial No. 105,884.

Our invention relates to mirrors, and has for its object the production of a mirror that will not produce a glaring reflection when exposed to bright light, and which nevertheless possesses the property of more clearly reflecting objects than mirrors of the present type.

A further object is to provide a mirror which will absorb glare to such extent that the reflected images are more clearly defined than in the case of older type mirrors, with both natural and artificial light.

Another object of our invention is to provide a non-glare mirror of a generally improved form.

The single figure of the accompanying drawing represents an edge view of a mirror made in accordance with our invention.

Non-glare mirrors of types heretofore commonly employed have been made either by using a black or darkened glass, or by using a clear glass that is darkened or blackened upon its rear surface. In such cases, either the darkened glass or the darkened-surface of the glass so absorbs light as to avoid glare, but a reflection is produced only from the front polished surface of the glass, and there is little depth or perspective to the reflected images. Consequently, when the mirror is employed as a rear-view mirror on an automobile, for instance, the driver can not determine with any reasonable degree of certainty his approximate distance from a vehicle approaching from the rear. This is particularly true at night when the headlights of vehicles to the rear are reflected in the glass. One viewing reflections in the mirror cannot tell whether another vehicle or other object is ten yards or one hundred yards to the rear.

While our invention is particularly suitable for use in connection with rear view mirrors, it may be applied in other relations where a non-glaring reflection is desired.

Broadly stated, our invention comprises the application of a darkened metal reflecting coating to the rear surface of the mirror glass so that all objects reflected thereby will be in proper proportion and perspective, and with clearness, while at the same time, glare is eliminated to a degree that the eyes of the observer are not strained or fatigued.

Some of the materials which we may employ are lead, or a combination of metals such as silver, copper, nickel, cobalt, platinum, or any other suitable metal which will produce a darkening effect and serve as a reflecting surface. The metal combinations referred to may be composed of silver, together with one of the other metals for darkening.

In employing lead as a metallic element, a mixture for application to the rear surface of the mirror may be as follows:

Solution No. 1.

Lead acetate _____ 1 oz.
Water _____ 24 oz.

Solution No. 2.

Sodium hydroxide or other alkali
  agent _____ 2 oz.
Water _____ 32 oz.

Solution No. 3.

Thio urea _____ 1 oz.
Water _____ 48 oz.

After preparation of the different solutions, the surface of the glass to be coated is washed and placed flatwise in a horizontal plane. The glass may have either atmospheric temperature or be heated somewhat—to 95 degrees F. for example.

Solutions 1 and 3 are then mixed in the proportions of four parts of solution No. 3 to one part of solution No. 1. Thereafter solution No. 2 is added to the mix, to the extent of one part of No. 2 solution and five parts of combined solution 1 and 3.

The completed mixture is then poured upon the glass, and the chemical action between the ingredients or solutions 1 and 2 immediately begins. Within about ten or fifteen minutes, the lead and other precipitates have been deposited upon the glass. Thereupon the surplus or undeposited materials are removed and the precipitated matter permitted to dry, after which a coating of shellac and a dark pigment backing is applied. If lead is employed as the metallic element, it is not necessary to apply a pigment, except as a protective coating, as is desirable in the case of some of the lighter colored metals, such as silver and platinum.

The sulphur which is present in the thio urea combines with the lead of the lead acetate and forms a lead sulphide which adheres to the glass, and this sulphide constitutes the reflecting surface. The same is true if salts of silver, copper, nickel, cobalt, platinum or the like are substituted for the lead acetate, but we have found the lead to be preferable.

Tests made of mirrors formed as above described show conclusively that between 30% and 40% of the light is reflected and that the remaining portion of the light is absorbed, thus diminishing the visible intensity of the reflected images, but nevertheless the amount of light reflected is sufficient to show perfectly clear and defined images under all conditions. Where bright lights are present, the absorption has the effect of so reducing the glare as to render the reflected images more clearly visible than if no substantial portion of the light were absorbed.

If nitrate of silver and platinum, or silver and some other metal are employed as a metallic element, solution No. 3, which contains thio urea and water is dispensed with and Rochelle salts, grape sugar, cane sugar and nitric acid, or Rochelle salts and caustic soda or other precipitating agent is used.

What we claim is:

1. A non-glaring mirror having a rear reflecting surface composed principally of lead sulphide.

2. A non-glaring mirror having a rear reflecting surface composed of a dark metallic sulphide.

3. A non-glare mirror comprising a transparent plate provided on one surface with a coating that will reflect not materially less than 30% and not materially more than 40% of the light incident thereon, and which will absorb the remainder of the light, thus diminishing the visible intensity of images reflected thereby.

In testimony whereof we the said GEORGE F. COLBERT and WILLIAM H. COLBERT have hereunto set our hands.

GEORGE F. COLBERT.
WILLIAM H. COLBERT.